United States Patent [19]

Carrara et al.

[11] Patent Number: 4,972,194
[45] Date of Patent: Nov. 20, 1990

[54] METHOD AND DEVICE FOR COMPENSATING FOR THE SPEED OF CLUTTER IN A COHERENT DOPPLER RADAR WITH VARIABLE BLIND SPEED

[75] Inventors: Bruno Carrara, Paris; Jean-Claude Guillerot, Versailles; Hubert Joncour, Palaiseau; Jacques Drevet, Paris, all of France

[73] Assignee: Thomson-CSF, Paris, France

[21] Appl. No.: 253,108

[22] Filed: Oct. 3, 1988

[30] Foreign Application Priority Data

Oct. 16, 1987 [FR]  France ................. 87 14294

[51] Int. Cl.$^5$ ............................................. G01S 7/28
[52] U.S. Cl. ................................................. 342/163
[58] Field of Search ........................ 342/159, 163

[56] References Cited

U.S. PATENT DOCUMENTS

| | | | |
|---|---|---|---|
| 3,720,941 | 3/1973 | Ares | 342/159 |
| 3,987,442 | 10/1976 | McLead, Jr. | 342/163 |
| 4,249,179 | 2/1981 | Kolacny | 342/163 |
| 4,290,066 | 9/1981 | Butler | 342/163 |
| 4,586,044 | 4/1986 | Hopwood et al. | 342/159 |

*Primary Examiner*—Thomas H. Tarcza
*Assistant Examiner*—Mark Hellner
*Attorney, Agent, or Firm*—Cushman, Darby & Cushman

[57] ABSTRACT

In a doppler radar, in order to compensate for the speed of moving clutter, one first establishes during a burst of order (i) the phase variation $\phi r_i$ from one period to the next and which is due to clutter in a given range cell. Then, this phase variation $\phi r_i$ is memorized and is used during the course of each of the periods of repetition of the next burst to modify the phase of the signal received from the clutter from the same range cell in a maner as to displace its Doppler frequency towards the zero frequencies band, and band which corresponds to the rejection zone of the fixed echoes eliminating filter.

11 Claims, 1 Drawing Sheet

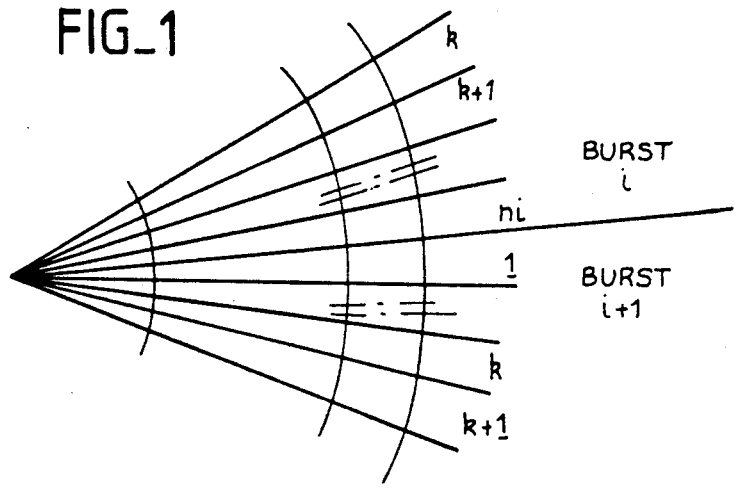
FIG_1
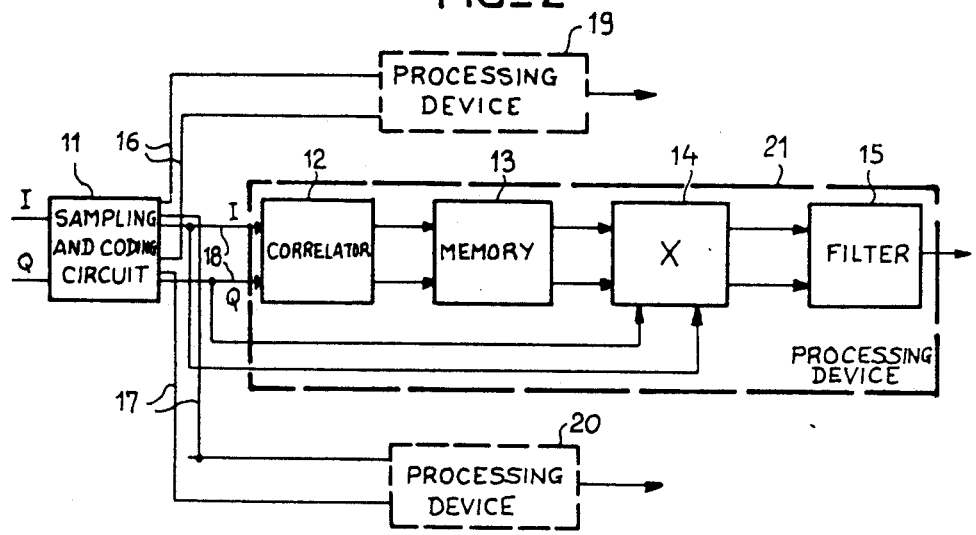
FIG_2
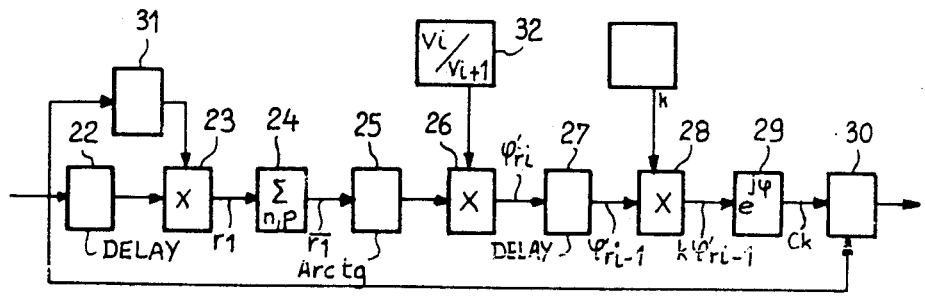
FIG_3

METHOD AND DEVICE FOR COMPENSATING FOR THE SPEED OF CLUTTER IN A COHERENT DÖPPLER RADAR WITH VARIABLE BLIND SPEED

BACKGROUND OF THE INVENTION

1. Field of the Invention

The invention concerns coherent Döppler radars with variable blind speed, and more particularly to a method and device for compensating for the speed of the clutter.

Pulse Coherent Döppler radars with constant blind speed, by exploiting the Döppler effect, enable moving objects, which give rise to radar signals of low intensity, to be detected amongst fixed objects which give rise to large amplitude radar signals. In effect, in these pulse radars, waves received after reflection from moving obstacles have a phase which varies from one period of repetition to the next. However, waves reflected from fixed obstacles do not have such a variation in phase shift. By virtue of this fact, the signals corresponding to moving obstacles display, after demodulation, components which vary sinusoidally at a frequency fd, generally called the Döppler frequency, which is linked to the radial speed v and to the wave length λ of the radar signal by the formula:

$$fd = \frac{2v}{\lambda}$$

Of course, the signals corresponding to fixed obstacles have a constant amplitude and their spectrum includes a series of discrete lines at the frequencies of F, 2 F, ... mF; F being the frequency of repetition of the pulses transmitted. Moreover, the spectrum of the pulses corresponding to moving obstacles is composed of discrete lines of the mF±fd type.

One can therefore understand that it is possible to get rid of the signals corresponding to fixed obstacles by using an echo elimination filter which only passes signals at frequencies close to zero. Depending on how wide or how narrow the rejection bandwidth of this filter is, one can also eliminate moving obstacles presenting low Döppler frequencies, for example, clouds, or again, fluctuating fixed obstacles that present a certain Döppler speed, such as trees moving in the wind. These various low velocity spurious echos are known as "clutter".

By virtue of the fact that the rejection bandwidth of the anti-clutter filter is not infinitely narrow, the moving echoes objects which have Döppler frequencies not only equal to mF but close to these latter, cannot be detected. It is therefore said that such a coherent Döppler radar with pulses of constant recurrence frequency presents "blind speeds".

To get over these blind speeds difficulties, one can transmit pulses, for example, which are separated by variable intervals of time. One can thus understand that certain moving echoes which were invisible, because confused with one of the mF lines, should "reappear", whilst fixed echos remain eliminated whatever the variation in these intervals of time between pulses.

In such radars, to allow for the appropriate treatment of the signals received, with the minimum of equipment, it is arranged that the time interval variations between consecutive pulses should follow certain laws or rules. Thus, it is sometimes arranged to transmit the pulses in bursts of q pulses which have, in a given burst, the same carrier frequency and the same recurrence frequency. In other words, from one burst to the next, the carrier frequency and the frequency of recurrence of the pulses may change. In such coherent Döppler radars with pulse burst emission, the blind speeds vary from one burst to the next in such a manner that the moving echos corresponding to the blind speeds of one burst are detected during the course of the other bursts which have different blind speeds.

In such radars, it is important to remove not only the fixed or pseudo-fixed echos, but also any other spurious echoes making up the clutter which have a large radial velocity. To this end, it is necessary to measure the radial velocity of the clutter and to compensate for this so as to bring the spectrum of the interference within the rejection zone of the filter, in order to eliminate them.

2. Description of the Prior Art

The commonly used methods for carrying out this compensation are based on the hypothesis that the clutter zone has a broad spread and has homogeneous characteristics in space and that it is sufficient to measure the average speed of a part of the zone. This measurement of speed is then used to "re-centre" the filter within the whole clutter zone.

This hypothesis of the wide spread and homogenity of the clutter is not always verifiable and low intensity spurious echoes are encountered which are of low spread both in terms of distance and direction and are of radial velocity markedly different from one interference echo to another within the same zone. This is the case of the echoes from eddies forming on the surface of the sea, where the radial velocities are very variable within a relatively small volume.

SUMMARY OF THE INVENTION

One of the objects of the present invention is therefore to implement a method for compensating the speed of the clutter in a coherent Döppler radar with pulse burst transmission which will eliminate the clutter composed of spurious echos of low spread and a wide range of radial velocities.

Another object of the invention is a method for compensating the speed of clutter which has a low response time.

Another object of the invention is to produce a device for implementing said method in a coherent Döppler radar with pulse burst transmission.

The invention provide a method of compensating for the speed of the clutter in a coherent Döppler radar emitting bursts of pulses and presenting a blind speed varying from one burst to another, comprising the following steps which are carried out on the signal received from each range cell which is of interest:

(a) measurement of the phase variation $\phi r_i$ from one period of repetition to the next in a burst of order i;

(b) memorizing of $\phi r_i$ for a time sufficient to be able to exploit it in the duration of the next burst of order (i+1);

(c) phase-shifting of the signal received from said range cell during each period of repetition of the next burst of order (i+1) of value k $\phi r_i$, k being the order of the period in the burst of order (i+1), in such a manner as to displace the Döppler frequency of the signal received from said range cell towards the zero frequencies, and (d) filtering of the phase-shifted signals in such a way as to eliminate signals with frequencies corresponding to zero or the neighbourhood of zero.

The method thus defined may be implemented according to different variants as a function of the constraints of the application concerned;

the measurement of the phase variation $\phi r_i$ may be carried out directly or, preferably, by a correlation of two successive signals received from the same range cell.

to suit the measurement of the phase $\phi r_i$ to the size of the clutter, it is provided that the calculation of the average of $\phi r_i$ be carried out on several range cells and on several periods of repetition of the same burst;

in order to adapt the measurement of the phase $\phi r_i$ corresponding to a blind speed $V_i$ to the value it would have with a blind speed $V_{i+1}$ corresponding to the next burst of order $(i+1)$, this phase $\phi r_i$ is multiplied by the ratio $V_i/V_{i+1}$ and the resulting value $\phi' r_i$ is used to carry out the phase-shifting of the signal received;

the phase-shifting of the signal received from a range cell obtained by the operation of multiplying the signal received during the period of order k by the coefficient $C_k = e^{jk\phi r_i}$ or $C'_k = e^{jk\phi' r_i}$;

it is proposed to precede the process described above by a filtering operation so as to remove fixed echos.

The invention also provides a device for implementing said procedure in a coherent Döppler radar transmitting pulses in bursts and presenting a blind speed variable from one burst to the next, the radar comprising means for amplitude-phase demodulating the signal received in response to the pulses transmitted and, means for sampling said demodulated signals in order to obtain samples each representative of the signal received from a range cell, said device for processing the signals received from the distance window comprising:

means for measuring from the samples the phase variation $\phi r_i$ from one period of repetition to the next in a burst of order i, means for preserving in a memory the phase variation $\phi r_i$ for sufficient time to be able to use it during the next burst of order $(i+1)$, means for modifying the phase of the signal received from a range cell during each period of repetition of the next burst of order $(i+1)$ of a value $k\phi r_i$, k being the order of the period of repetition in the burst of order $(i+1)$ so as to shift the Döppler frequency of the signal received from said range cell towards the zero frequencies and means for filtering the output signals of the phase modification device so as to eliminate signals corresponding to zero frequencies and to frequencies close to zero.

In a preferred embodiment, the samples are coded in digital form so that all the operations may be carried out digitally by the appropriate circuits.

BRIEF DESCRIPTION OF THE DRAWINGS

Other characteristics and advantages of the present invention will appear on reading the following description of a particular example of the implementation of the method and device, said description being undertaken in relation to the appended drawing in which:

FIG. 1 is a diagram showing the succession of the periods of recurrence and the bursts during rotation of the antenna of the radar;

FIG. 2 is a functional diagram of the device implementing the method according to the invention, and FIG. 3 is a detailed functional diagram of circuits 12, 13 and 14 of the device in FIG. 2.

DESCRIPTION OF THE PREFERRED EMBODIMENT

The method in accordance with the invention is based on the measurement of the radial velocity of the clutter in a range cell, or quantum, in the duration of a burst of pulses transmitted at a certain recurrence frequency and on the use of this measurement to modify the signal received from the same range cell during the next burst of pulses transmitted at a different frequency of recurrence so that the clutter may be removed by the fixed echoes eliminating filter.

The measurement of the radial velocity may be a measurement carried out on two consecutive recurrences, the average of the measurements carried out during all or part of the burst and may cover one or more range cells. Moreover, instead of modifying the signal received from the distance window in order to make it appear as a fixed echo, one may obviously modify the characteristics of the fixed echo elimination filter so as to displace the centering of the rejection zone.

Instead of measuring specifically the radial velocity of the clutter in a range cell, or its Döppler frequency, one may in fact determine the variation in phase shift of the signals received during two successive recurrences of order k and k+1 of the burst of order i (FIG. 1) by carrying oput the correlation calculation:

$$r_1 = S_{k,i} \cdot S^*_{k+1,i}$$

a formula in which $S_{k,i}$ represents the signal received at recurrence k of burst i.

$S_{k+1,i}$ represents the signal received at recurrence k+1 of burst i and the sign (*) symbolizes the operation of conjugating the complex numbers.

As the signals $S_{k,i}$ and $S_{k+1,i}$ may be written in the case of an obstacle of radial velocity $V_r$:

$$S_{k,i} = A_i e^{2\pi j f d_i (t + kTr_i)}$$

$$S_{k+1,i} = A_i e^{2\pi j f d_i [t + (k+1)Tr_i]}$$

with $$fd_i = \frac{2V_r}{\lambda_i}$$

formulae in which $A_i$ is the amplitude of the signal of burst i, $fd_i$ its Döppler frequency at burst i, $\lambda_i$ the wavelength of burst i and $Tr_i$ the period of repetition of the pulses of burst i, it results from this that the correlation $r_1$ may be expressed in the form:

$$r_1 = C e^{-2\pi j f d_i Tr_i} = C e^{j\phi r_1}$$

where $C = A_i^2$ is a real positive constant and $\phi r_i = -2\phi \cdot fd_i Tr_i$ is the argument of $r_1$.

According to the invention, this phase $\phi r_1$ is entered in a memory to be used for the next burst i+1 in the following manner in order to achieve the compensation of the radial speed.

Let $S_{k,i+1}$ be the signal received at recurrence k of burst i+1, the compensation of the speed is obtained by multiplying signal $S_{k,i+1}$ by the term:

$$C_k = e^{jk\phi r_i} = e^{-j2\pi k f d_i T r_i}$$

and the signal, after compensation, is written:

$$S'_{k,i+1} = C_k S_{k,i+1}$$

If a Döppler frequency f is considered, one may write:

$$S_{k,i+1} = A_{i+1} e^{j(2\pi f \cdot k T r_{i+1} + \phi_{o,i+1})}$$

a formula in which $A_{i+1}$ is the amplitude of the signal of burst i+1, $Tr_{i+1}$ is the period of repetition of the pulses of burst i+1, $\phi_{o,i+1}$ is the initial phase of the signal of burst i+1. After compensation, the signal becomes:

$$\begin{aligned}S'_{k,i+1} &= A_{i+1} e^{j[2\pi k(fTr_{i+1} - fd_iTr_i) + \phi_{o,i+1}]} \\ &= A_{i+1} e^{j\left[2\pi k\left(f - fd_i \frac{Tr_i}{Tr_{i+1}}\right)Tr_{i+1} + \phi_{o,i+1}\right]}\end{aligned}$$

In the case of an object of constant radial velocity, the Döppler frequencies of the signal at burst i and burst i+1 are linked by the ratio:

$$\frac{fd_i}{fd_{i+1}} = \frac{\lambda_{i+1}}{\lambda_i}$$

where $\lambda_{i+1}$ is the wavelength used for burst i+1. The signal, after compensation, is expressed as:

$$S'_{k,i+1} = A_{i+1} e^{j\left[2\pi k f d_{i+1}(-\frac{\lambda_{i+1}}{\lambda_i} \frac{Tr_i}{Tr_{i+1}})(Tr_{i+1} + \phi_{o,i+1}\right]}$$

This formula shows that the Döppler frequency of the signal at burst i+1 is brought by the compensation carried out to the new value:

$$f'd_{i+1} = fd_{i+1}(1 - \frac{\lambda_{i+1}}{\lambda_i} \frac{Tr_i}{Tr_{i+1}})$$

By introducting the blind speeds of bursts $i$ and $i + 1$:

$$V_i = \frac{\lambda_i}{2Tr_i} \text{ and } V_{i+1} = \frac{\lambda_{i+1}}{2Tr_{i+1}}$$

one obtains the expression of the new Doppler frequency at burst $i + 1$:

$$f'd_{i+1} = fd_{i+1}\left(1 - \frac{V_{i+1}}{V_i}\right)$$

Now, as the values of $V_{i+1}$ and $V_i$ are very close to one another, their ratio is close to unity and $f'd_{i+1}$ is very small in the face of $fd_{i+1}$, that is to say, in the neighborhood of zero frequency. This means that the compensation has enabled the Döppler frequency of the clutter to be moved towards zero frequency. As a consequence, the elimination of the clutter is then achieved by applying the compensated signal to a Döppler filter which presents a rejection zone around the zero frequency, i.e. to a filter for eliminating fixed echos.

This fixed echo eliminating filter receives the digital signals corresponding to a range cell according to a repetition period which depends on the burst concerned, for example $Tr_{i+1}$; in addition, these digital signals, before entering the filter, have undergone phase compensation which depends on the preceding burst of period $Tr_i$ but which is applied on a period $Tr_{i+1}$. There results from this therefore, a modification of the transfer function of the filter during the period $Tr_{i+1}$ which is expressed on the basis of the initial transfer function H(f) by:

$$\begin{aligned}Hr(fd_{i+1} \cdot Tr_{i+1}) &= H(f'd_{i+1} \cdot Tr_{i+1}) \\ &= H\left[fd_{i+1}\left(1 - \frac{V_{i+1}}{V_i}\right)Tr_{i+1}\right] \\ &= H\left[\left(fd_{i+1} \frac{V_i - V_{i+1}}{V_i}\right)Tr_{i+1}\right]\end{aligned}$$

This identity may be expressed in the form:

$$Hr\left(\frac{fd_{i+1}}{F'r_{i+1}}\right) = H\left(\frac{fd_{i+1}}{Fr_{i+1}}\right)$$

in which $$Fr_{i+1} = \frac{1}{Tr_{i+1}} \text{ and } F'r_{i+1} = \frac{V_i}{V_i - V_{i+1}} Fr_{i+1}$$

On the hypothesis that the values of $V_i$ and $V_{i+1}$ are very close to each other, the ratio $$\frac{V_i}{V_i - V_{i+1}}$$

is large in relation to unity so that $F'r_{i+1}$ is much larger than $Fr_{i+1}$.

This shows that the recentering of the radial velocity corresponds to having available a pulse repetition frequency $F'r_{i+1}$ which is much larger than $Fr_{i+1}$, which improves filtering performance for obstacles with a high radial velocity whilst ensuring better rejection of the clutter of spurious echos of a relatively low speed.

On the basis of the explanations which have just been given, the method of compensation for the speed of the clutter in a coherent Döppler radar with pulse transmission in bursts of variable repetition period comprises the following operations:

1. After demodulating/of the signal received, to obtain from it the two complex components I and Q, these latter are sampled and amplitudecoded, each sample, or code, $S_{k,i}$ corresponding to a given range cell.

2. This operation is followed by a correlating operation $r_1$ on the codes corresponding to the same range cell and to the same burst i of transmitted pulses of blind speed $V_i$ so as to determine the phase variation $\phi r_i$ between two pulses which is the speed of the clutter in said range cell.

3. This phase $\phi r_i$ is memorized so as to be used during next pulse burst i+1 transmitted with a blind speed $V_{i+1}$.

4. At each period of order k of burst i+1, there takes place the multiplication of the code $S_{k,i+1}$, corresponding to the signal received in said range cell, by the coefficient $C_k = e^{jk\phi i}$, so as to obtain a code $S'_{k,i+1}$ which corresponds to a recentered signal of the speed of the clutter;

5. Filtering of $S'_{k,i+1}$ signal, for example by a fixed echo elimination filter of conventional type.

A device for implementing the method described above may be constructed as shown in the functional diagram in FIG. 2, of which each rectangle 11 to 15 represents one of the operations 1 to 5. Thus, the reference 11 designates a sampling and coding circuit of the I and Q components of the signal received in a period of repetition. The correlation $r_1$ is carried out by a circuit 12 and the phase variation $\phi r_i$ is recorded by a memory 13. A multiplying circuit 14 which receives, on the one hand, the phase $\phi r_i$ and on the other hand, signal $S_{k,i+1}$, carries out the multiplication of this latter signal by $e^{j\phi r_i}$, which corresponds, in fact, to a rotation of the phase of the signal. Finally, a filter 15 eliminates the signals whose frequency matches its rejection zone.

Circuits 12 to 15 can only process signals relating to a single range cell which means that it is necessary to have as many chains of circuits 12 to 15 as there are range cells, to be handled. It is for this reason that, in FIG. 2, the sampling and coding circuit 11 presents several pairs of output conductors 16, 17 and 18, which are connected respectively to the processing devices 19, 20 and 21, each comprising circuits 12 to 15, each pair 16, 17 or 18 corresponds to a given range cell.

FIG. 3 is a detailed functional diagram of circuits 12, 13 and 14 of FIG. 2 which includes possible variants. On this diagram, the two components I and Q of the complex signal have been omitted for the sake of clarity but it must be understood that the correlation operation is carried out with the help of these two components.

The correlation circuit 12 comprises a delaying circuit 22 for the signal $S_{k,i}$ which introduces a delay equal to a repetition period $Tr_i$, a calculating circuit 31 for calculating the conjugate $\overline{S_{k,i}}$ and a multiplying circuit 23 which carries out the multiplication of $\overline{S_{k,i}}$ by the signal $S_{k-1,i}$, received one period $Tr_i$ previously, if one is in the burst i.

In a variant, it is proposed that the correlation calculation $r_1$ be carried out on the same two successive periods, of order k-1 and k, for example, of each burst. In this case, the output of circuit 23 is directly connected to circuit 25 which calculates the phase $\phi r_i$.

In another variant, that of FIG. 3, the output of circuit 23 is connected to a circuit 24 for calculating the average of the correlation $r_1$ for several range cells, for example n, and on several recurrences of burst i, for example p. This variant enables the system to avoid the erratic detection of the same clutter from one range cell to the following one and from one recurrence to the next. It is the average $\overline{r_i}$ of the correlations $r_1$ which is used to calculate the phase by means of a circuit 25 which carries out the operation arc tangent $\overline{r_i}$ or arc tangent $r_1$ if the calculation of the average is not done by circuit 24.

In a variant, it is proposed that the output of circuit 25 be connected directly to a delaying circuit 27 which introduces a delay equal to the duration of a burst in a manner as to use $\phi r_i$ of burst i during following burst i+1. As mentioned above, this phase variation $\phi r_i$ corresponds to a blind speed $V_i$ and is used in a burst which has a blind speed $V_{i+1}$, which introduces a bias in the compensation of the clutter speed. But the effect of this bias is negligible if the variation in the blind speeds between one burst and the following one is slight.

This bias and its effects can be removed by implementing the variant of FIG. 3 in which the phase $\phi r_i$ is multiplied by a coefficient $$\frac{V_i}{V_{i+1}}$$

worked out in a circuit 32 so as to obtain a phase $\phi' r_i$ which takes account of the variation of the blind speed from one burst to the next. In other words, if the phase variation of the signal is included between $-\pi$ and $\pi$, the phase $\phi' r_i$ is that which one would obtain by carrying out the measurement during next burst (i+1).

This phase $\phi' r_i$ is memorized by delaying circuit 27, which may be a memory, to be used during next burst i-1, which means that the phase being used during, burst is $\phi' r_{i-1}$. This phase $\phi' r_{i-1}$ is supplied to a multiplier circuit 28 which carries out a multiplication by an integer k which corresponds to the order in burst i of the period of repetition in course. It is, as a matter of fact, an incremental increase of $\phi' r_{i-1}$ from one period to the next.

The output of multiplier circuit 28 is coupled to a circuit 29 for the calculation of the coefficient $C_k = e^{jk\phi' r_{i-1}}$ by the addition of the two components $\cos k\phi r_{i-1}$ and $j \sin k\phi r_{i-1}$. The output of circuit 29 is connected to a multiplier circuit 30 which also received the signal $S_{k,i}$ of the period in course and which carries out the multiplication of $S_{k,i}$ by $C_k$ to obtain $S'_{k,i}$. It is this last signal which is filtered in the filter 15 of FIG. 2.

The method and the device according to the invention have been described in accordance with the variants in which the calculation of the phase variation $\phi r_i$ is carried out by a correlation $r_1$ which constitutes the most accurate way of determining the phase variation. But such methods imply calculations being carried out on complex signals, which is slow to do and demands costly equipment.

According to yet another variant of the invention, it is proposed to replace the correlation operation by the direct measurement of the phase difference between two successive samples in the range cell being processed. In this case, the diagram of FIG. 3 is simplified by the fact that the correlation circuits 22, 23 and 31 and the circuit 24 for the calculation of the average are no longer necessary because the components I and Q are applied directly to circuit 25. In such a variant, the calculation of the average of several range cells not bring about any improvement because the information on the amplitude of the signal in the range cell no longer exists. However, it does avoid the aberrant measurements caused by fluctuations in the amplitude of the signal by measuring the phase difference in that range cell which presents the greatest amplitude of two or three adjacent cells and by preventing recentering on measurements that are too low in amplitude or in phase.

The methods and devices which have just been described present the disadvantage that the signals processed come from range cells which contain not only moving clutter, which it is desired to remove, but also echoes from fixed objects. On the one hand, it results from this that the measurement of the phase $\phi r_i$ is falsely affected and, on the other, that compensation is equally applied to fixed echoes which may move them out of the rejection zone of the fixed echo elimination filter.

As a consequence, according to another variant of the present invention, it is proposed to have the operations described above preceded by a filtering to remove the fixed echoes so that the measurement of $r_i$ is no longer disturbed. In addition, the compensation is not applied to the fixed echoes since these have been eliminated by the already carried out filtering.

We claim:

1. A method of compensating for the speed of moving clutter in a coherent Doppler radar transmitting pulses in bursts and presenting a blind speed variable from one burst to the next, comprising the following steps which are carried out on the signal received from each range cell of interest:

(a) measuring the phase variation $\phi r_i$ from one period of repetition to the next in a burst of order i;

(b) memorizing $\phi r_i$ during a time sufficient to be able to use it during the next burst of order (i+1);

(c) phase-shifting the signal received from said range cell during each period of repetition of the next burst of order (i+1), of a value k$\phi r_i$, k being the order of the period in burst (i+1), so as to displace the Doppler frequency of the signal received in said range cell towards zero frequencies, and (d) filtering the phase-shifted signals in a manner so as to eliminate signals corresponding to zero frequencies and frequencies in the neighborhood of zero.

2. A method according to claim 1 wherein the step of measuring phase variation $\phi r_i$ comprises the step of determining a correlation.

3. A method according to claim 2 wherein the step of determining a correlation comprises the step of multiplying a signal $S_k,i$ received in a range cell during the period of order k of burst of order i, by the conjugate of a signal $S_{k+1}$ received from the same range cell during the following period of order k+1 of the burst of order i.

4. A method according to claim 2 further comprising the step of calculating the average of signals $r_1$ resulting from the correlation of several periods of repetition of the same burst.

5. A method according to claim 2 further comprising the step of calculating the average of the signals resulting from the correlation of several range cells extending radially.

6. A method according to claim 1 wherein the step of measuring phase variation $\phi r_i$ comprises the steps of measuring the phase difference between the signals received from one and the same range cell during two successive repetitions periods of a burst of order i.

7. A method according to claim 1, further comprising the step of weighting of the phase variation $\phi r_i$ by a coefficient that is determined by the ratio of the blind speeds of the bursts of order (i) and (i+1) in such a manner that the phase-shifting to be carried out on the received signal should take count of the difference between the blind speeds of one burst and the next.

8. A method according to claim 1, wherein the step of phase-shifting of the received signal comprises the step of the signal received during the period in course of order k by a coefficient $C_k = e^{jk\phi r_i}$.

9. A method according to claim 1, further comprising the steps of filtering preceding the sampling and coding in a manner as to eliminate fixed echoes.

10. A coherent Doppler radar arrangement, comprising:

means for transmitting pulses in bursts and presenting a blind speed variable from one burst to the next;

means for amplitude-phase demodulating signals received in response to the transmitted pulses;

means for sampling said demodulated signals to obtain samples each representative of the signal received in a range cell; and means for processing signals received from a range cell, said processing means including:

means for measuring, from said samples, the phase variation $\phi r_i$ between one period of repetition to the next in a burst of order i;

means for memorizing the phase variation $\phi r_i$ for a time sufficient to be able to use it for the duration of the next burst of order (i+1);

means for modifying the phase of the signal received in a range cell during each period of repetition of the next burst of order (i+1), of a value k$\phi r_{i,k}$ being the order of the period of repetition in the burst of order (i+1), in a manner as to displace the Doppler frequency of the signal received in said range cell, towards the zero frequencies; and means for filtering the output signals of the phase modifying means in a manner as to eliminate signals corresponding to zero frequencies and to frequencies in the neighborhood of zero.

11. A radar arrangement according to claim 10, wherein the phase variation measuring means comprises a correlation arrangement which in turn comprises:

means for memorizing signal $S_{ki+1}$ received in a range cell during the period of order k of burst of order i for a duration equal to the period of repetition of the pulses transmitted, means for calculating the conjugate of signal $S_{ki+1}$ received in the same range cell during the next period of order (k+1) of burst of order i, means for multiplying the memorized signal $S_{ki+1}$ and the conjugate of the signal $S_{k+1,i}$ during the period of order (k+1) of burst of order i, and means of calculating the phase $\phi r_i$ from the output signal of the means of multiplication.

* * * * *